Patented Jan. 1, 1929.

1,697,162

UNITED STATES PATENT OFFICE.

MORTIMER BYE, OF CINCINNATI, OHIO, ASSIGNOR TO THE WILLIAM S. MERRELL COMPANY, OF CINCINNATI, OHIO, A CORPORATION OF OHIO.

BLOOD COAGULANT.

No Drawing.     Application filed February 11, 1927. Serial No. 167,587.

Blood coagulants in general use, intended for administration by mouth or by hypodermic injection, are liquids which have in suspension the coagulating principles in colloid, or other forms, together with inert materials which may tend to impair the commercial appearance of the product, its therapeutic effectiveness, and the keeping qualities of the product.

It is the object of my invention to provide a blood coagulant which will be a clear water-white solution, or a soluble powder which can be dissolved to make such a clear water white solution.

I take a desirable quantity of suitable body tissue, such as lung tissue, that has been treated in any one of the usual ways to mince the material, and add to it an excess of aqueous solution of 1% sodium chloride. This I macerate for a suitable number of hours and then separate the solids from the liquid by suitable means, such as by settling and decanting, centrifugalization or filtration. To the resultant liquid I add an excess of sulphuric, hydrochloric or other acids. This precipitates a substance that has strong blood clotting properties. This precipitate may be purified by a suitable means as, for example, as follows:—I separate the precipitate from the liquid and to this precipitate add an alkaline solution such as sodium hydroxide. This is added in sufficient quantity to cause the precipitate to go into solution. By careful regulation a clear solution is obtained which will be practically neutral in reaction. Further repurifications can be made by successive treatments with acids and alkalies as just noted. I find that this solution has very active blood clotting properties, that its clear water-white appearance enhances its commercial value, that it has greater keeping qualities than the cloudy coagulants now in use, and that, if reduced to a dried and powdered form by suitably driving off the moisture, this powdered product will also have a high coagulating value. The addition of water to this product will again produce the clear water-white solution.

What I claim is:

1. A soluble powdered substance comprising a blood-clotting-extract of body tissue that will dissolve to form a clear neutral water-white solution.

2. A soluble powder comprising a blood-clotting-extract of body tissue precipitated from a salt solution by an excess of acid and treatment with an alkali and which may be dissolved to form a clear neutral solution.

3. A clear neutral water-white solution of a blood-clotting-extract of body tissue.

4. A clear neutral solution of a blood-clotting-extract of body tissue precipitated from a suitable salt solution by an excess of acid and treatment with an alkali to produce a practically neutral substance.

In testimony whereof, I have hereunto subscribed my name this 10th day of February, 1927.

MORTIMER BYE.